United States Patent
Bacon (10) Patent No.: US 7,215,038 B2
(45) Date of Patent: May 8, 2007

(54) WIND WHEEL AND ELECTRICITY GENERATOR USING SAME

(76) Inventor: C. Richard Bacon, 5718 Northshore, Clark Lake, MI (US) 49234

( * ) Notice: Subject to any disclaimer, the term of this patent is extended or adjusted under 35 U.S.C. 154(b) by 100 days.

(21) Appl. No.: 11/190,026

(22) Filed: Jul. 26, 2005

(65) Prior Publication Data
US 2007/0024060 A1 Feb. 1, 2007

(51) Int. Cl.
*F03D 11/00* (2006.01)
(52) U.S. Cl. .......................... 290/55; 290/44
(58) Field of Classification Search ................. 290/43, 290/44, 54, 55; 60/398; 416/232, 194
See application file for complete search history.

(56) References Cited

U.S. PATENT DOCUMENTS

| | | | | |
|---|---|---|---|---|
| 1,233,232 A * | 7/1917 | Heyroth | ....................... | 290/55 |
| 1,352,960 A | 9/1920 | Heyroth | | |
| 4,088,352 A * | 5/1978 | Kling | ........................... | 290/55 |
| 4,168,439 A | 9/1979 | Palma | ........................ | 290/44 |
| 4,289,970 A * | 9/1981 | Deibert | ........................ | 290/44 |
| 4,330,714 A * | 5/1982 | Smith | ........................... | 290/55 |
| 4,720,640 A * | 1/1988 | Anderson et al. | ............. | 290/43 |
| 5,315,159 A * | 5/1994 | Gribnau | ........................ | 290/55 |
| 6,064,123 A * | 5/2000 | Gislason | ...................... | 290/55 |
| 6,664,655 B2 * | 12/2003 | Vann | ........................... | 290/55 |
| 6,700,216 B1 | 3/2004 | Vann | ........................... | 290/44 |
| 6,774,504 B1 * | 8/2004 | Lagerwey | ..................... | 290/44 |
| 6,952,058 B2 * | 10/2005 | McCoin | ........................ | 290/44 |
| 7,109,600 B1 * | 9/2006 | Bywaters et al. | ............. | 290/55 |
| 7,154,191 B2 * | 12/2006 | Jansen et al. | .................. | 290/55 |

* cited by examiner

*Primary Examiner*—Nicholas Ponomarenko
(74) *Attorney, Agent, or Firm*—Young & Basile, P.C.

(57) ABSTRACT

A wind-driven power source comprises a propeller-driven rotor structure and a stator structure carrying clusters of copper-wire wound ferromagnetic cores as voltage generators. The cores are arranged in pairs spaced apart by hard rubber rollers which engage the inside surface of a load ring forming part of the rotor structure. The overall rotor structure comprises the large diameter load ring, a smaller diameter root ring and a plurality of aerodynamic blades extending radially outwardly from the root ring and secured either by saddle blocks or integral bonding to the load ring. The load ring may be aluminum or plastic. Permanent magnets are arranged around the load ring to interact with the voltage generator structures to produce three-phase electricity.

22 Claims, 8 Drawing Sheets

WIND WHEEL AND ELECTRICITY GENERATOR USING SAME

FIELD OF THE INVENTION

This patent relates to wind wheels and to wind-driven electricity generators using wind wheels. More particularly, the disclosure herein describes a wind-driven generator of minimal complexity, lightweight and optimized efficiency which can be constructed of low cost components.

BACKGROUND

It is known to use wind wheels to perform mechanical functions and to generate electricity. An early wind wheel electrical generator is disclosed in U.S. Pat. No. 1,233,232, issued Jul. 10, 1917, to A. H. Heyroth. The Heyroth wind wheel comprises a large diameter rotor ring carrying permanent magnets and a center axle which supports the rotor ring by means of radial spokes. Rotation of the rotor ring causes the permanent magnets mounted thereon to move past stationary magnetic cores and the changes of flux value through the cores result in the generation of electrical voltages in windings carried by the cores.

A similar but more recent device is shown in U.S. Pat. No. 6,064,123, issued May 16, 2000, to Nils Gislason.

Still another device is shown in U.S. Pat. No. 6,664,655 issued Dec. 16, 2003, to Charles S. Vann. The Vann wheel comprises a large number of short radial blades fixed between two large-diameter, concentric metal rings. The outer ring is supported for rotation on three outside rollers and the ring can be magnetized so as to form part of a voltage generator or a motor.

SUMMARY

This disclosure describes a wind wheel particularly, but not exclusively, suited for use in an electricity generator. To the extent so used, the generator involves optimal application of the following principles:

1. Higher rotor speeds generally result in higher generator output power.
2. Higher rotor speeds are more easily achieved with a lighter, lower-mass rotor structure; and
3. It is advantageous to minimize torque and moments drag forces on the rotor structure.

The wind wheel of the present invention affords optimal use of these principles in a rotor structure comprising shell diameter root ring, a larger diameter outer ring, and a plurality of lightweight blades structurally connected at their inner ends to the root ring and at a midpoint to the outer ring. The outer ring is used in a rotary support system typically using rollers to allow the rotor to rotate about an axis which is common to the root and outer rings.

When used in an electricity generator, the lightweight rotor can carry a plurality of spaced permanent magnets to co-act with one or more stationary core arrangements to produce electricity as the rotor rotates.

The present arrangement requires no center axle and has the potential to produce high rotor speed for any given wind force or speed without the need for a gear box. The use of a midpoint structural ring providing support at the midpoints of the blade allows for the use of lightweight materials such as foam core composition for blade construction.

These and other advantages of the invention will be best understood from a reading of the following specification which describes the preferred embodiment of the invention.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
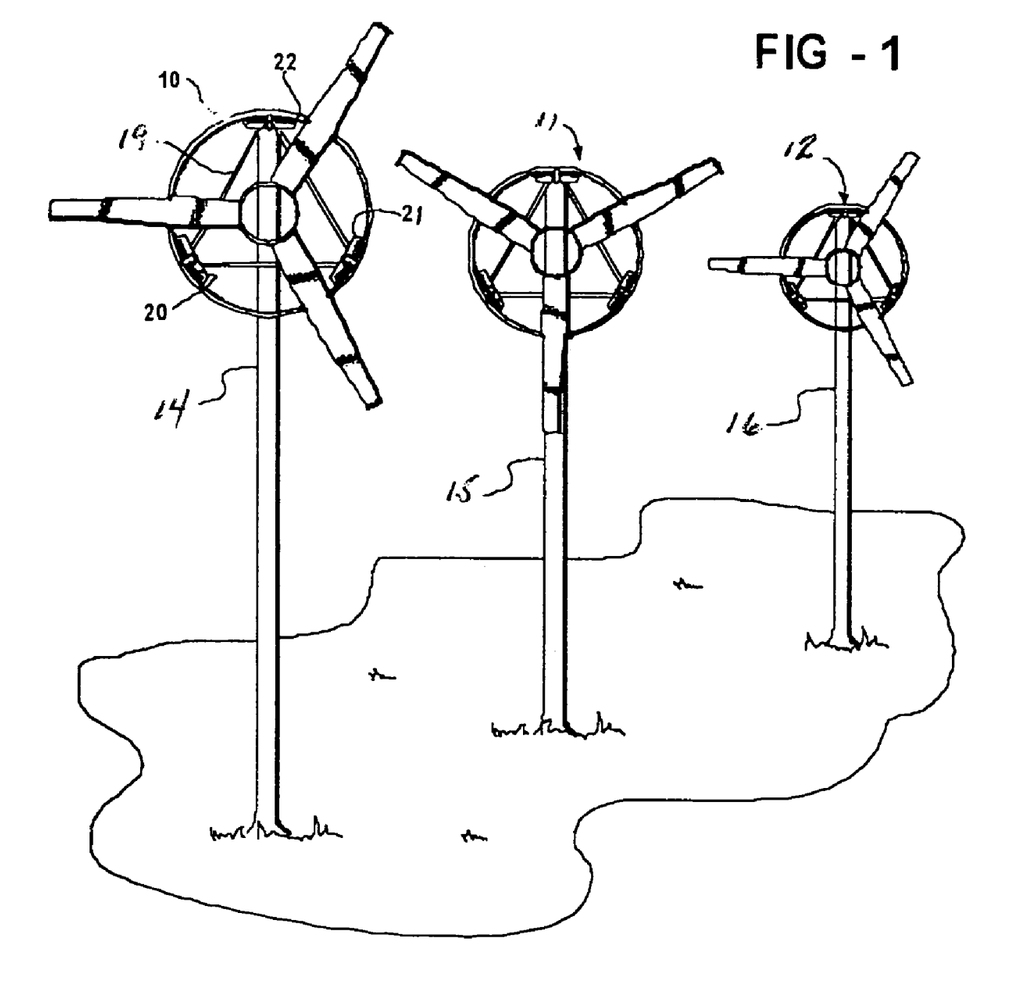
FIG. 1 is a perspective view of a portion of a "wind farm" employing three generators constructed in accordance with the present invention and mounted on poles.

Referring first to FIG. 1, there is as shown a portion of a "wind farm," including identical wind-driven power sources 10, 11 and 12 mounted on poles 14, 15 and 16 to collect wind and produce electricity from the energy contained therein. Since all of the sources 10, 11 and 12 are identical, only source 10 will be described in detail.

Referring now to FIGS. 2–7, source 10 comprises a stator structure 18 made up of three triangularly arranged aluminum struts 19 mounted on the pole 14. The stator structure 18 includes three generating units 20 and 21 mounted on plates 50 and 22 described in greater detail with reference to FIGS. 4 and 5. Again, the units 20, 21 and 22, although in different locations on the power source 10, are identical and unit 20 is described as representative.

Figure 2:
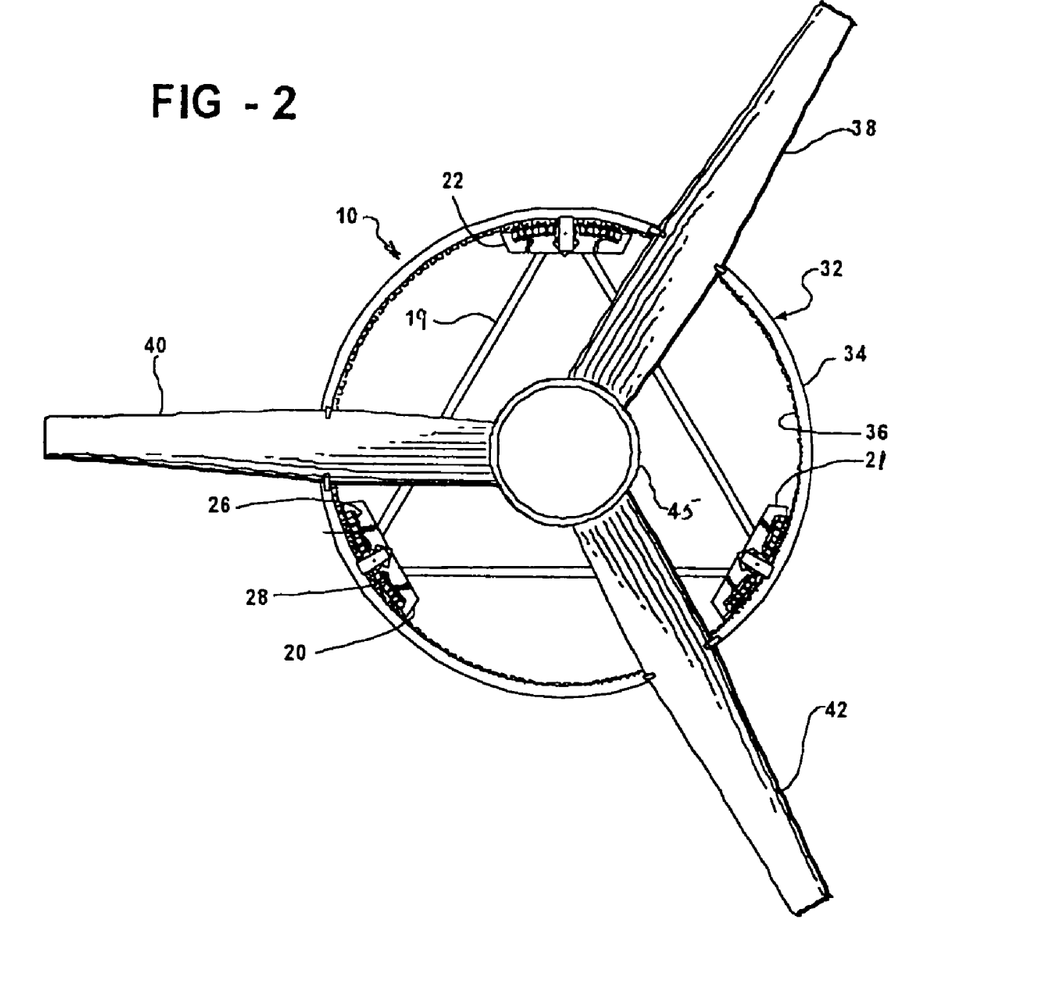
FIG. 2 is a detail of one of the generators of FIG. 1.
Figure 3:
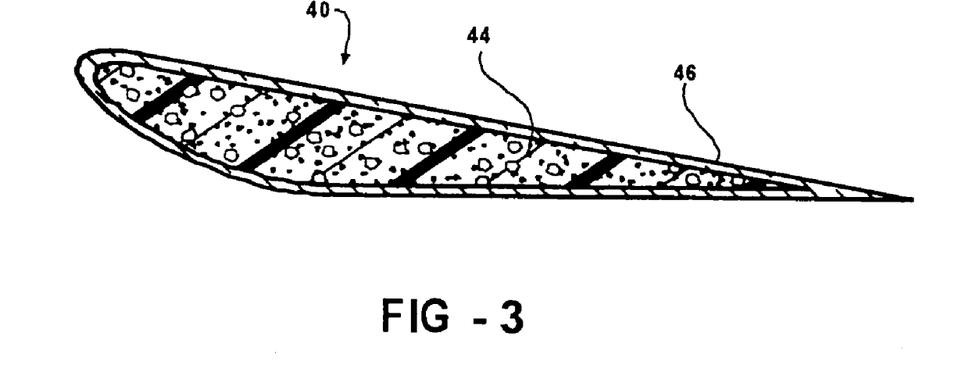
FIG. 3 is a cross-section of one of the propeller blades of the structure of FIG. 2.

Unit 20 comprises two ferromagnetic iron cores 26 and 28 closely arranged around opposite sides of and straddling a roller 30 which is one of three stator-mounted rollers symmetrically arranged on the plate 50 of the stator structure 18. The rollers 30 support a rotor structure 32, the largest component of which is an aluminum ring 34. This is variously referred to herein as the "outer ring" or the "load ring" and, in this embodiment, includes a number of components, including a ferrous metal backer ring 48 and an array of permanent magnets 36 bonded to the radially inner surface of the broken ring, to generate electricity. The aluminum ring 34 makes the structure light and easy to accelerate while the iron backer ring 48 provides a flux path for the magnetic system. The rotor structure 32 further includes lightweight composite aerodynamic blades 38, 40 and 42 which, as best shown in FIGS. 2 and 3, are preferably made by overlaying a rigid foam plastic core 44 with a synthetic resin exterior covering 46.

The rotor structure 32 further comprises a non-ferrous root ring 45 to which the blades 38, 40 and 42 are attached at their inner ends. The root ring 45 may be of a composite, plastic construction or of other relative lightweight material. By way of example, the blades 38, 40 and 42 may be approximately five feet in length. The root ring 45 may be approximately two feet in diameter and the aluminum load ring 34 may be approximately six feet in diameter. As such, the load ring 34 is attached near the radial midpoint of the rotor structure 32 to add strength and rigidity to the blades to resist torque deflection. The blades are cambered with the pitch of approximately forty-two degrees at the inner or root end thereof and approximately one-half of one degree at the outside tips. The pitch changes gradually from end to end.

Figure 4:
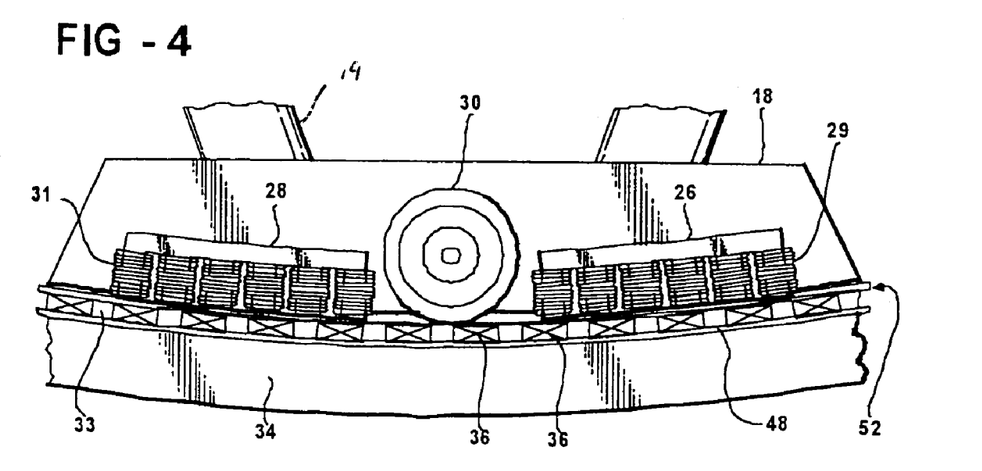
FIG. 4 is a detail of the structure of FIG. 2 showing the arrangement of voltage generator core structures straddling an inside roller as part of the stator structure for the device of FIG. 2.
Figure 5:
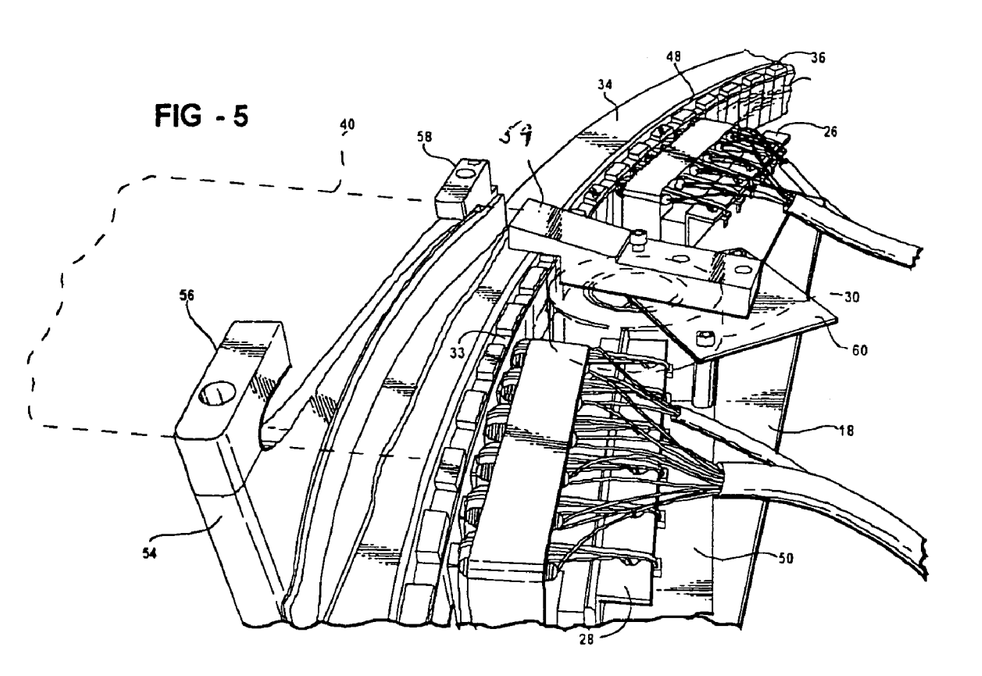
FIG. 5 is a detail of the structure of FIG. 2 showing the core structures, permanent magnets and propeller blade mounting structure in three-dimensional detail.

Referring to FIGS. 2 through 5, the stator and rotor structures will be described in greater detail. The stator structure 18 comprises aluminum plates 50 at the apices of the triangular support struts shown in FIG. 6. Each plate 50 holds a pair of spaced apart, laminated, iron cores 26 and 28 wound with copper coils 29 and 31. Between each set of two core structures 26 and 28 is rotatably mounted a hard rubber roller 30 which engages the outer surfaces of a polycarbonate track 52 running over the outside surfaces of the permanent magnets 36 which are bonded to a steel backer ring 48 mounted on the aluminum load ring 34 to provide a continuous magnetic flux path. Non-magnetic spacers 33 are disposed between the permanent magnets 36. The polycarbonate track 52 is a thin film bonded over the flat surface defined by the combination of the magnets 36 and the spacers 33, as best shown in FIGS. 5 and 6.

The rollers 30 make contact with and ride on the flat surface provided by the polycarbonate track 52 for smooth vibration-free rotation of the load ring 34 of the rotor structure 32. The ferromagnetic cores 26 and 28 are located in close proximity to but spaced from the polycarbonate ring by approximately 0.180 inch. In a practical embodiment of the size described above, it has been found that the magnetic force of attraction between the permanent magnets and the ferromagnetic core structures 26 and 28 is approximately 40 pounds per voltage generation unit for a total of 80 pounds of attraction at each of the three stator structures 18 as the magnetic rotor rotates past. In order that the aluminum load ring 34 be able to withstand these attractive forces without deflection, the rotor rollers 30 are preferably mounted symmetrically between the closely matched pairs of cores 26 and 28 for maximum resistance to deflection so that they contact the inside surface of the load ring directly between the core structures. Additional rollers 37 are rotatably mounted behind the stator structure as shown in FIG. 6 to provide thrust support; i.e., support in the direction parallel to the axis of rotation.

Figure 6:
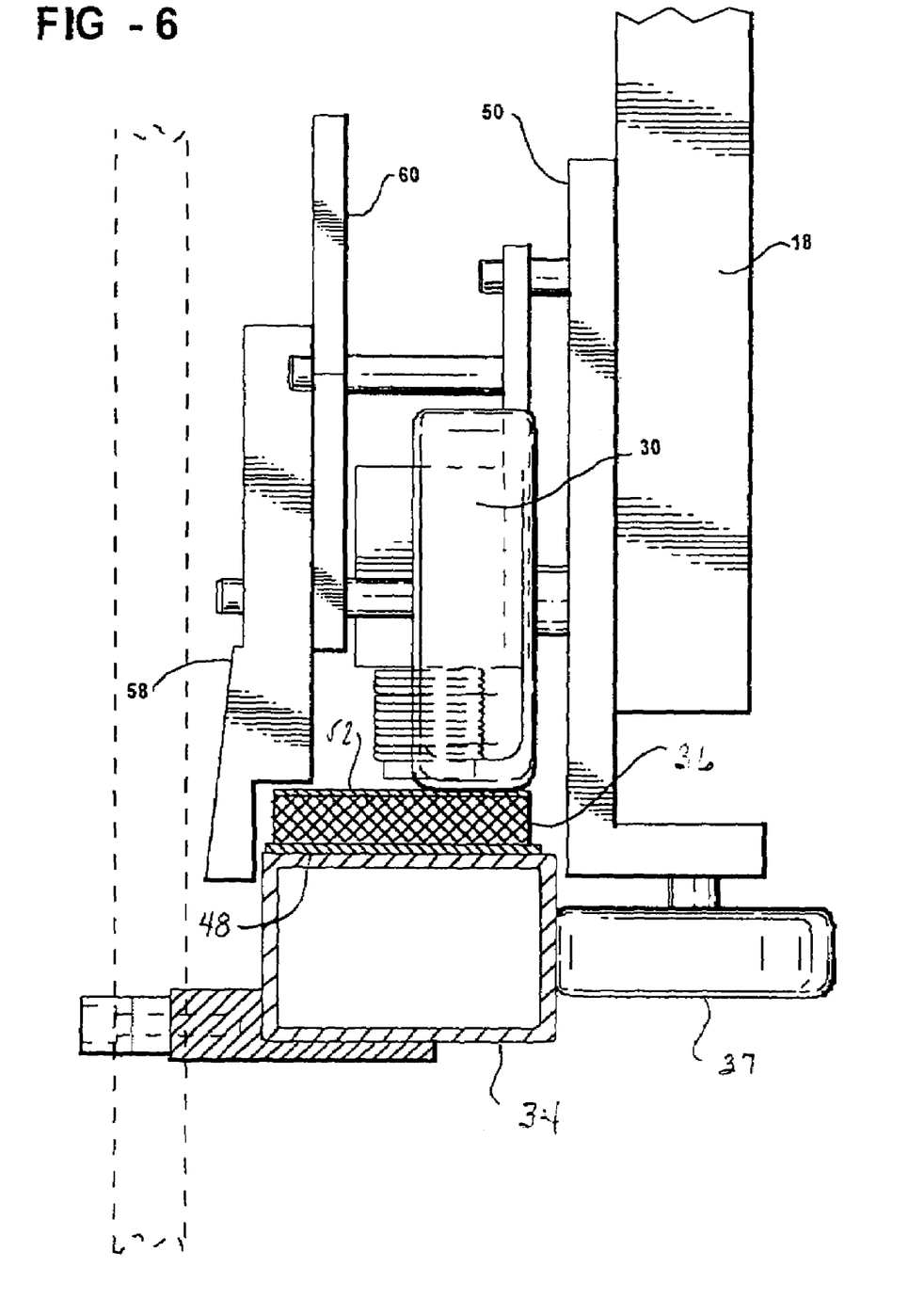
FIG. 6 is a side view of the structure of FIG. 5 showing part of the rotor in cross-section.
Figure 7:
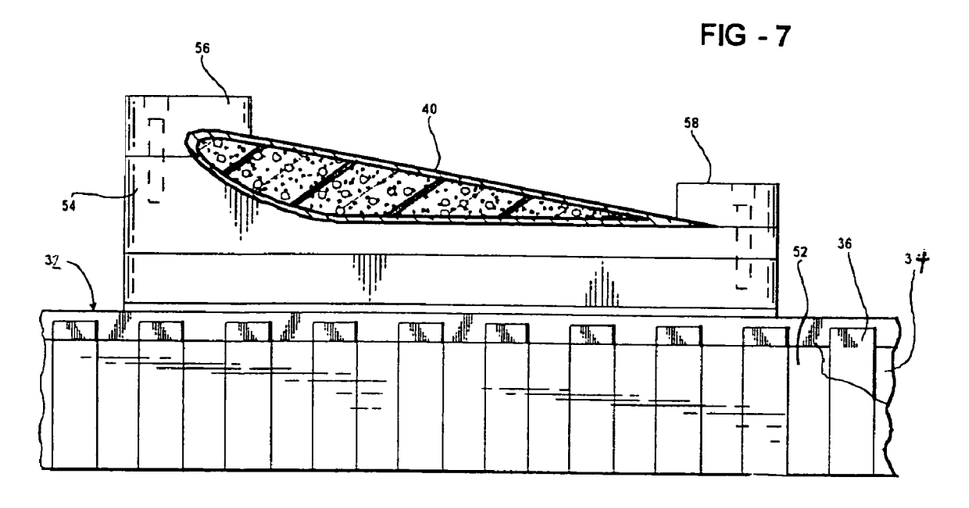
FIG. 7 is a cross-section of a blade showing additional rotor structure.

The blade support structure is best shown in FIGS. 5, 6 and 7 to comprise saddle blocks 54 which receive and conform to the inside surfaces of each of the blades 38, 40 and 42. Clamp blocks 56 and 58 attach by way of cap screws to the saddle blocks to trap the blades 38, 40 and 42 and hold them firmly to the load ring 34 for overall rigidity.

Stops 58 are preferably attached by cap screws to plates 60 on the stators 18 to prevent the rotor 32 from moving forwardly of the stator structure. The spacing between the stops 59 and the outer surface of the load ring 34 may be on the order of ¼ inch; minimal reverse thrust loading is experienced and thus no outside rollers are required.

By way of summary, each of the generator units comprises a stator structure 18 consisting of a triangular frame made of struts 19 and three symmetrically arranged pairs of generating units 20, 21 and 22. Each generating unit includes a pair of ferromagnetic cores 26 and 28 and wound coils straddling a roller 30 adapted to ride on the radially inner track 52 of the load ring 34. The load ring 34 is integrally attached to each of the lightweight propeller blades 38, 40 and 42 at approximately the midpoints thereof to add structural stiffness. The inside surface of the load ring 34 is provided with an array of permanent magnets 36 which move in radially spaced relationship to the stator cores 26 and 28 to generate voltages in the cells as the propeller blades 38, 40 and 42 drive the rotor ring in a circular path.

Figure 8:
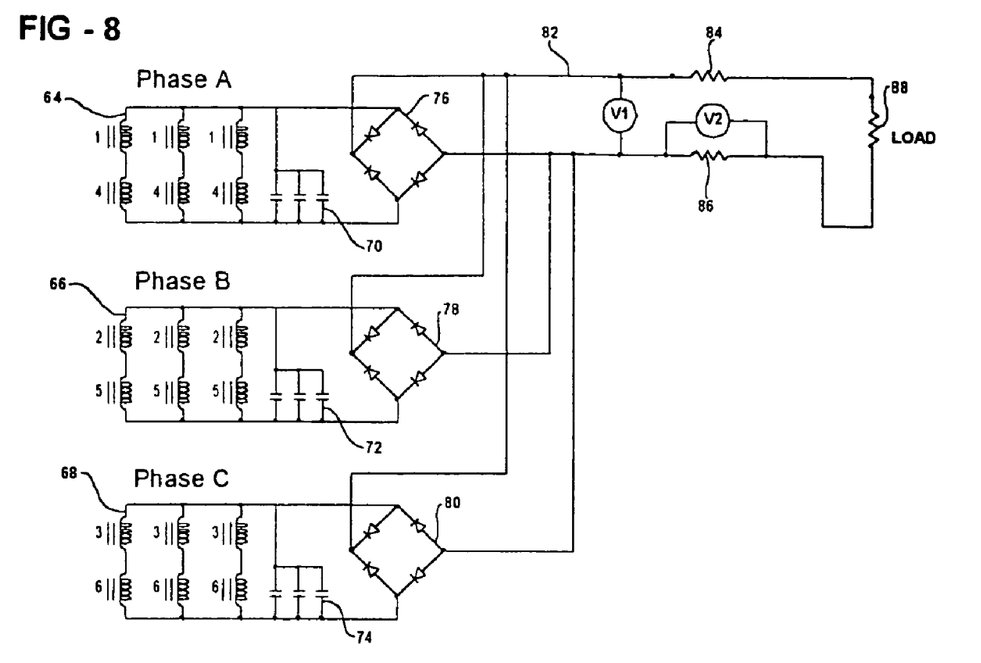
FIG. 8 is a representative circuit diagram generating three-phased power from the structure of FIGS. 1–7.

Referring now to FIG. 8, a representative electrical system based on the use of 160 permanent magnets on the inside of the six foot load ring 34 is shown. The system comprises clusters 64, 66 and 68 of six coils each spaced to create a three-phase electrical system. The two matching-phase coils in each cluster are wired in series. There are six identical clusters. Each cluster has its respective matching phased coil pairs wired in parallel to form an output circuit. Each of these output circuits has a capacitor bank 70, 72 and 74 connected between the leads to correct the power factor. Each circuit is then fed to one of the full-wave rectifiers 76, 78 and 80, respectively, to provide unregulated DC voltage to an output circuit comprising resistors 84, 86 and 88. The circuit of FIG. 8 shows voltage meters in strategic locations to monitor output. Each coil is in a representative example consisting of 100 turns and the air gap between the cores of the generator structures and the magnets are approximately five millimeters.

In a successfully operated embodiment, the weight of the blades are approximately 36 pounds total and safely rotated at a speed of up to 250 revolutions per minute. The total weight of the magnets is approximately 15 pounds and the rollers 30 are 4 inches in diameter and made of hard rubber.

Figure 9:
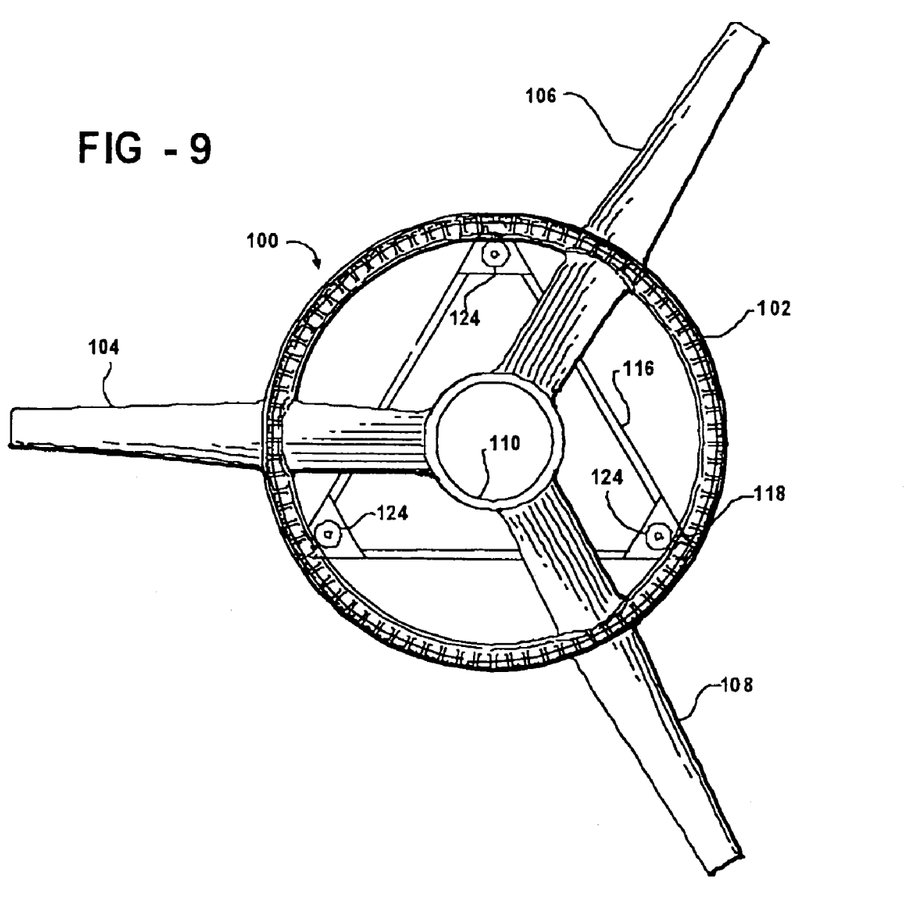
FIG. 9 is a plan view of an alternative embodiment of a rotor structure.
Figure 10:
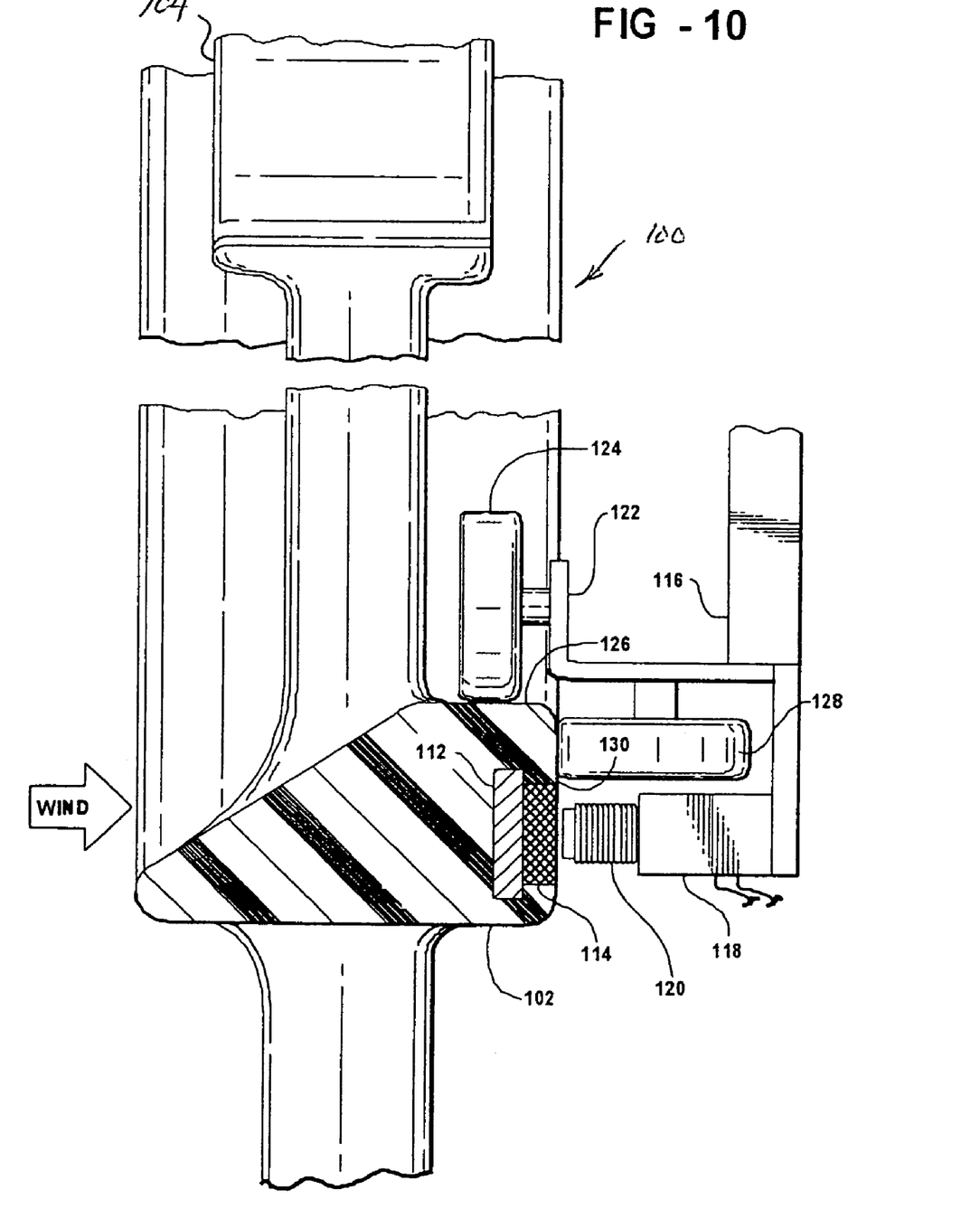
FIG. 10 is a partial cross-section of the structure of FIG. 9 in greater detail showing the support rollers for the rotor of FIG. 9 and the relationship between the permanent magnets and the voltage-generating structures mounted on the stator.

Referring now to FIGS. 9 and 10, an alternative rotor structure 100 will be described. The rotor structure comprises a load ring 102 made of molded lightweight plastic and having an aerodynamic or wedge-shaped cross-section as shown in FIG. 10. The plastic load ring 102 is physically integrated with the blades 104, 106 and 108 at approximate midpoints thereof as shown in FIG. 9. The inner ends of the blades are bonded by standard fiberglassing techniques to the smaller diameter root ring 110. The term "fiberglassing" is intended to encompass composite structures of various kinds including those using fibers of graphite, glass and other materials.

Whereas the permanent magnets 36 of the embodiment of FIG. 4 are mounted on the radially inside surface of the load ring 34, the permanent magnets 114 of the embodiment of FIGS. 9 and 10 are arrayed annularly around the leeward or downwind surface 130 of the load ring 102 and are bonded to an annular ferromagnetic backer ring 112 which is cast into the load ring 102 as shown in FIG. 10. A plastic surface can be placed atop the magnets for weather proofing. Rollers 124 bear against the inside surface 126 of the load ring 102 and are arranged in the symmetrical and equally-spaced arrangement shown in FIG. 9. Those rollers are carried by the stator structure 116 which, like the first embodiment, is made up of a triangular arrangement of beams. Ferromagnetic core structures 118 with wound coils 120 are also placed on the stator structure 116 closely adjacent to the track of the permanent magnets 114 as the rotor rotates. Thrust support is provided by means of rollers 128 which bear against the surface 130 radially inboard of the track of the permanent magnets 114.

In this embodiment, the generating units are essentially out of the airstream, i.e., in the shadow of the load ring 102 to reduce losses due to windage. Only the radial rollers 124 and smaller portions of the stator structure lie in the windstream. This structure may be made extremely light in weight and extremely rigid because of the possibility for integrating with epoxy-bonding, fiberglassing techniques and the like. The electrical arrangement of FIG. 8 may also be used in combination with the structures of FIGS. 9 and 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wind-driven generator comprising:
   a stator structure;
   a rotor structure including:
      a root ring having an axis of rotation;
      a lightweight, non-magnetic load ring concentric with said root ring;
      a plurality of aerodynamic blades pitched to be rotated by wind moving parallel to said axis of symmetry, each of said blades being secured at its inner end to said root ring and at a midpoint to said load ring;
      a ferrous metal backer ring mounted to the load ring;
      a plurality of permanent magnets attached to the backer ring;
      a plurality of rollers mounted on said stator structure and positioned to run on the load ring; and
      a plurality of electric generator structures mounted to said stator structure closely adjacent to said rollers and spaced from said load ring to generate electricity as said load ring and magnets rotate thereby.

2. A wind-driven generator as defined in claim 1, wherein said electric generator structures comprise pairs of iron cores with voltage generating coils wound thereon, one of said plurality of rollers being disposed between the cores in each of said pairs of cores.

3. A wind-driven generator as defined in claim 1, wherein said blades are of varying pitch, the greatest pitch of each blade being nearest the root ring.

4. The wind-driven generator as defined in claim 1, wherein said non-ferromagnetic load ring is aluminum.

5. A wind-driven generator as defined in claim 3, wherein said non-ferromagnetic load ring is aluminum.

6. A wind-driven generator as defined in claim 1, wherein said blades are made of a foam plastic material covered with reinforced resin.

7. A wind-driven generator as defined in claim 3, further including a plastic track surface defining member overlying said magnets.

8. A wind-driven generator as defined in claim 7, wherein said backer is attached to a radially inner surface of said load ring.

9. A wind-driven generator as defined in claim 8, wherein said rollers bear against said inner surface and said electric generator structures are mounted on said stator structure to be closely spaced relative to said inner surface.

10. A wind-driven generator as defined in claim 1, wherein said backer ring is attached to a leeward surface of said load ring.

11. A wind-driven generator as defined in claim 10, wherein said rollers support said leeward surface.

12. A wind-driven generator as defined in claim 1, wherein means are provided for clamping said blades to said load ring.

13. A wind-driven generator as defined in claim 1, wherein said blades are integrally bonded to said load ring.

14. A wind-driven generator as defined in claim 1, wherein the electric generator structures are wired to generate three-phase electricity.

15. A wind-driven generator as defined in claim 8, further including a plurality of thrust rollers mounted on said stator structure and bearing against a leeward surface of said load ring.

16. A wind-driven generator as defined in claim 10, wherein said permanent magnets are embedded in said load ring.

17. A wind-driven generator as defined in claim 16, wherein said permanent magnets are embedded in said load ring.

18. A wind-driven generator as defined in claim 17, wherein said track surface defining member is bonded to the leeward surface of said load ring.

19. A wind-driven generator as defined in claim 1, wherein said blades are three in number.

20. A wind-driven generator as defined in claim 1, wherein said blades are six in number.

21. A wind-driven generator comprising:
   a stator structure;
   a rotor structure including a root ring having an axis of symmetry, a load ring concentric with said root ring and a plurality of aerodynamic blades secured between said root ring and said load ring;
   a continuous array of permanent magnets attached to a surface of said load ring;
   a track surface defining member disposed over said magnets;
   a plurality of rollers mounted on said stator structure and positioned to run on said track surface defining member; and
   a plurality of electric generator structures mounted on said stator structure closely adjacent to said roller and spaced from said surface to generate electricity as said magnets pass thereby.

22. A wind-driven generator as defined in claim 21, wherein said load ring is made of plastic.

* * * * *